United States Patent [19]

Pohl et al.

[11] Patent Number: 4,634,685

[45] Date of Patent: Jan. 6, 1987

[54] REFRACTORY ARTICLE SUITABLE FOR CASTING MOLTEN METAL

[75] Inventors: Siegfried Pohl, Heidenrod; Ernst Lührsen, Bad Schwalbach; Peter Jeschke, Walluf; Ortwin Rave, Marktredwitz; Martin Kienow, Krefeld; Werner Richter, Krefeld-Fischeln, all of Fed. Rep. of Germany

[73] Assignee: Didier-Werke AG, Wiesbaden, Fed. Rep. of Germany

[21] Appl. No.: 793,687

[22] Filed: Oct. 31, 1985

[30] Foreign Application Priority Data

Nov. 2, 1984 [DE] Fed. Rep. of Germany ....... 3439954

[51] Int. Cl.$^4$ .............................................. C04B 35/52
[52] U.S. Cl. ...................................... 501/100; 75/257; 106/240; 106/313; 148/23; 148/24; 148/26; 264/60; 264/63; 264/332; 501/105; 501/127
[58] Field of Search ....................... 501/100, 105, 127; 106/240, 313; 148/23, 24, 26; 75/257; 264/60, 63, 332

[56] References Cited

U.S. PATENT DOCUMENTS

| | | | |
|---|---|---|---|
| 3,934,637 | 1/1976 | Potier | 164/56.1 |
| 3,937,269 | 2/1976 | Salvadore et al. | 164/473 |
| 3,949,803 | 4/1976 | Hiroishi et al. | 164/473 |
| 4,040,469 | 8/1977 | Potier et al. | 164/56.1 |
| 4,174,226 | 11/1979 | Fitzpatrick et al. | 501/124 |
| 4,540,675 | 9/1985 | Morris et al. | 501/101 |

*Primary Examiner*—Stephen J. Lechert, Jr.
*Attorney, Agent, or Firm*—Wenderoth, Lind & Ponack

[57] ABSTRACT

A refractory article for casting of liquid melts, especially steel, fabricated from a mixture of $Al_2O_3$, graphite, a flux component, a synthetic resin binder and a metallic powder. The flux component contains a first flux with a melting point from 550° to 900° C. and a second flux that becomes active in the mixture in a temperature ranging from 1350° and 1550° C. The refractory article need not be heated before use, and the carbon contained therein, which determines the strength of the article, is retained for a much longer period during use, so that the article will have a long service life.

17 Claims, No Drawings

REFRACTORY ARTICLE SUITABLE FOR CASTING MOLTEN METAL

BACKGROUND OF THE INVENTION

The present invention relates to a refractory article suitable for casting molten metal, i.e. liquid melts, especially steel.

German Auslegeschrift No. 21 64 301 discloses a refractory material based on graphite, aluminum oxide and silicon carbide, for the preparation of which a vitreous material and a carbonaceous binder are used. This refractory material is said to possess excellent resistance to slag attack, chipping resistance, and resistance to oxidation at high temperatures. It is produced by an electric casting or burning process, and it is said that it can be used for the discharge orifice of a basic oxygen furnace, for the bottom plate of ingot molds for top casting, or for the tapping spout of a blast furnace.

SUMMARY OF THE INVENTION

The object of the present invention is the fabrication of a refractory article, especially an article normally subjected to wear in the casting of liquid melts, especially steel, e.g. immersion spouts or ghost tubes, which possess a long service life while retaining high mechanical strength.

This object is achieved by providing a refractory article which is characterized by the fact that a mixture has been used for its fabrication which contains a first flux with a melting point ranging from 550° to 900° C., a second flux with a melting point ranging from 1350° to 1550° C., a synthetic resin as a carbonaceous binder, and a metallic powder.

DETAILED DESCRIPTION OF THE INVENTION

More specifically, the present invention provides a refractory article suitable for casting molten metal, which comprises, based on the weight of said article:
  30 to 64% of $Al_2O_3$;
  20 to 40% of graphite;
  10 to 20% of a synthetic resin;
  1 to 8% of a metallic powder; and
  4 to 20% of a flux component comprising a first flux having a melting point of 550° to 900° C. and a second flux having a melting point of 1350° to 1550° C., the weight ratio of said first flux to said second flux being 2:1 to 1:15.

The raw materials used for the production of the refractory article are discussed below.

Examples of the aluminum oxide, $Al_2O_3$, include fused alumina and tabular alumina. The fused alumina preferably has a particle size of up to 0.5 mm, whereas the tabular alumina is preferably employed with a particle size of up to 0.12 mm. Mixtures of fused and tabular alumina may also be employed.

Another constituent is graphite, examples of which are flake graphite in which the ash content is preferably below 30% by weight.

A synthetic resin is utilized as the carbonaceous binder for the production of the refractory article. Examples of these resins are liquid epoxy resins and liquid phenolic resins.

Another constituent is a metallic powder, preferably with a particle size below 0.09 mm.

With metallic powder is meant a powder of silicon, aluminium or ferro silicium.

A flux component is used as another constituent for the production of the refractory article, and comprises a first flux and a second flux.

The first flux has a melting point between 550° and 900° C. Examples of these fluxes are boron-containing substances such as boric acid, borax and boron frit. This first flux melts quickly when the melting point is reached.

The second flux has a melting point ranging from 1350° to 1550° C., and flows at this temperature. Examples of this second flux are feldspars, glass frits, mixtures of feldspar and $ZrO_2$ or $ZrSiO_4$, and mixtures of feldspar and very fine (mealy) aluminum oxide. When such mixtures are used as the second flux, they preferably contain at least 50% by weight of feldspar.

Most preferably, the second flux is an alkali metal feldspar, e.g. sodium or potassium feldspar.

The $Al_2O_3$ is preferably used in an amount of 40 to 55% by weight. Graphite is preferably used in an amount of 20 to 30% by weight. The proportion of metallic powder in the starting mixture is preferably 2 to 6% by weight. The synthetic resin binder is preferably used in an amount of 12 to 18% by weight.

In addition to using the synthetic resin binder, other carbonaceous and pyrolyzable substances such as tars and pitches can be employed, for example in an amount not greater than the amount of the synthetic resin.

The total amount of the first and the second fluxes is preferably 8 to 15% by weight. The weight ratio of the first to the second flux is generally 2:1 to 1:15, preferably 1:1 to 1:10, more preferably 1:3 to 1:8.

A surprising finding was that an attack on carbon, which produces the binding of the refractory wear part, is largely avoided by the use of the two fluxes of the aforementioned type.

The first flux is preferably added in the granular form, i.e., with a particle size essentially greater than 0.1 mm, while the second flux is preferably used as a very fine flour, i.e., with a particle size less than 0.04 mm.

The present invention also provides a process for producing the refractory article, containing the stated amounts of $Al_2O_3$, graphite, synthetic resin, metallic powder and flux component, which process comprises the steps of:
  providing a mixture containing said amounts of said $Al_2O_3$, graphite, synthetic resin, metallic powder and flux component;
  molding said mixture;
  annealing the molded mixture to cure said synthetic resin; and
  heat-treating the annealed article at a temperature of up to 1000° C. which is sufficient to melt said first flux, in a non-oxidizing atmosphere.

Preferably, the first and second fluxes are premixed with each other to prepare the flux component, which is then mixed with the other constituents to obtain the mixture to be molded.

If necessary, a liquid can be added to the mixture to facilitate molding. Examples of these liquids are water and organic, readily volatile liquids.

If a phenolic resin solution is used, the addition of a liquid during the mixing process may be omitted. If the resulting mixture is very plastic, i.e., if it contains an excess of liquid, it should be dried until it can be molded in a suitable press, preferably an isostatic press, into the molded article, e.g. a molded article in the form of an immersion spout or a ghost tube.

After the molding of the article and the drying thereof to remove any residual liquid, say, for 1 to 8 hours at temperatures between 60° and 120° C., an annealing process is carried out, preferably up to a maximum temperature of about 200° C., during an appropriate period of, say, 1 to 24 hours, in order to cure the resin, so that the molded article attains adequate strength. Then, for example, after being packed in carbon dust, the molded article is subjected to temperatures up to 1000° C. in a non-oxidizing atmosphere, i.e. a reducing atmosphere or with substantial exclusion of air.

The resultant article may then be totally or partially raw-glazed, as desired or required, during which any conventional glaze is applied. This glaze serves to inhibit oxidation during use of the refractory article, i.e it is applied to the surfaces of the article that do not come into contact with the liquid metal when in service.

The heat-treated, glazed or unglazed molded article may also be subjected to oxidizing burning carried out at a temperature of about 900° to 1000° C., preferably at 950° C., during which the carbon is burned off the unglazed surfaces of the article. In this case, the first flux protects the structure from excessive damage. The oxidizing burning is preferably carried out for a period of 20 minutes to 5 hours.

Thus, the present invention also provides a refractory article suitable for casting molten metal, which is produced by a process comprising the steps of:
providing a mixture which comprises, based on the weight of said mixture, 30 to 64% $Al_2O_3$, 20 to 40% of graphite, 10 to 20% of a synthetic resin, 1 to 8% of a metallic powder, and 4 to 20% of a flux component comprising a first flux having a melting point of 550° to 900° C. and a second flux having a melting point of 1350° to 1550° C., the weight ratio of said first flux to said second flux being 2:1 to 1:15;
molding said mixture;
annealing the molded mixture to cure said synthetic resin;
heat-treating the annealed article at a temperature of up to 1000° C. which is sufficient to melt said first flux, in a non-oxidizing atmosphere; and
subjecting the resultant article to a temperature of 900° to 1000° C. in an oxidizing atmosphere.

When employing the refractory article of the invention, the second flux becomes active only during use, for example, during the casting of steel at 1500° to 1550° C., i.e. it melts at these temperatures and protects the C-binding in the article at these operating temperatures. This means that the second flux used according to the invention does not become too watery and has not been already evaporated at operating temperatures, so that it is still effective even during use.

Thus, the refractory articles of the present invention have the advantages that they need not be heated before use, and also the carbon in the articles, which determines the strength of the article, is retained for a much longer period of time during use, giving the articles a long service life.

The invention will now be further illustrated by the following examples, which are not intended to limit the invention.

EXAMPLE 1

A mixture of 24 parts by weight of fused alumina with a particle size of up to 0.5 mm, 8 parts by weight of fused alumina with a particle size of up to 0.12 mm, 15 parts by weight of tabular alumina with a particle size of less than 44 µm, 5 parts by weight of a silicon powder with a particle size of up to 0.09 mm, 30 parts by weight of natural flake graphite, 60% of which had a particle size greater than 0.16 mm, 3 parts by weight of borax with a particle size of 0.3 to 0.75 mm as the first flux, and 5 parts by weight of potassium feldspar as the second flux, were thoroughly blended in a mixer, to which were then added 14.2 parts by weight of a liquid phenolic resin solution with a content of 70% by weight of resin.

After thorough blending, the plastic mixture was dried until it could be molded in an isostatic press.

It was then molded in an isostatic press into a casting tube with an inside diameter of 100 mm, an outside diameter of 150 mm, and a length of 1,000 mm under a pressure of 800 bar, and thereupon dried for 4 hours at a temparature of 80° C. To cure the resin, an annealing process was carried out up to a maximum temperature of about 200° C. for 12 hours. Thereupon, the molded article was packed in carbon dust and brought to 800° C. at a heating rate of about 10° C./hr, and kept there for about one hour.

A conventional low-melting glaze was applied to the outside surface of the tube and the applied glaze was dried at about 90° C. to produce the raw glaze.

The article with the raw glaze was then burned in an oxidizing atmosphere at 950° C. for 0.5 hour, during which the carbon was burned off the surface of the unglazed inside of the tube.

This article could be used as a protective tube for the pouring stream between a ladle and a distributor during the continuous casting of steel without preliminary heating of the tube.

EXAMPLE 2

The procedure in Example 1 was repeated except for using a liquid epoxy resin as the synthetic resin binder, boric acid as the first flux, and a mixture of alkali feldspar and $ZrSiO_4$ as the second flux.

After heat-treating at 800° C., the resulting article was not glazed and also was not subjected to oxidizing burning. The article thus obtained was used as an immersion spout for steel casting. Preliminary heating of the immersion spout was likewise not necessary, and it possessed a very long service life.

We claim:
1. A refractory article suitable for casting molten metal, which comprises, based on the weight of said article:
   30 to 64% of $Al_2O_3$;
   20 to 40% of graphite;
   10 to 20% of a synthetic resin;
   1 to 8% of a metallic powder; and
   4 to 20% of a flux component comprising a first flux having a melting point of 550° to 900° C. and a second flux having a melting point of 1350° to 1550° C., the weight ratio of said first flux to said second flux being 2:1 to 1:15.
2. A refractory article according to claim 1, which further comprises a raw glaze on at least a portion of the total surface area of said article to inhibit oxidation of said article.

3. A refractory article according to claim 1, wherein said first flux is a boron-containing flux.

4. A refractory article according to claim 3, wherein said boron-containing flux is selected from the group consisting of boric acid, borax and boron frit.

5. A refractory article according to claim 1, wherein said second flux is selected from the group consisting of a feldspar, a glass frit, a mixture of a feldspar and $ZrO_2$, a mixture of a feldspar and $ZrSiO_4$, and a mixture of a feldspar and aluminum oxide.

6. A refractory article according to claim 1, wherein said second flux is an alkali metal feldspar.

7. A refractory article according to claim 1, wherein said metallic powder is a powder of silicon, aluminium or ferro silicon.

8. A refractory article according to claim 7, wherein said metallic powder is a powder of silicon.

9. A refractory article according to claim 1, wherein said synthetic resin is selected from the group consisting of a liquid epoxy resin and a liquid phenolic resin.

10. A refractory article according to claim 1, which comprises 40 to 55% of said $Al_2O_3$, 20 to 30% of said graphite, 12 to 18% of said synthetic resin, 2 to 6% of said refractory metallic powder, and 8 to 15% of said flux component.

11. A refractory article according to claim 10, wherein the weight ratio of said first flux to said second flux is 1:1 to 1:10.

12. A refractory article according to claim 11, wherein said weight ratio is 1:3 to 1:8.

13. A process for producing a refractory article suitable for casting molten metal, which article comprises, based on the weight of said article, 30 to 64% of $Al_2O_3$, 20 to 40% of graphite, 10 to 20% of a synthetic resin, 1 to 8% of a metallic powder, and 4 to 20% of a flux component comprising a first flux having a melting point of 550° to 900° C. and a second flux having a melting point of 1350° to 1550° C., the weight ratio of said first flux to said second flux being 2:1 to 1:15, said process comprising the steps of:

providing a mixture containing said amounts of said $Al_2O_3$, graphite, synthetic resin, metallic powder and flux component;

molding said mixture;

annealing the molded mixture to cure said synthetic resin; and heat-treating the annealed article at a temperature of up to 1000° C. which is sufficient to melt said first flux, in a non-oxidizing atmosphere.

14. A process according to claim 13, which further comprises applying a glaze to at least a portion of the total surface area of the article after said heat-treating step.

15. A process according to claim 13, wherein said first and second fluxes are premixed with each other to prepare said flux component.

16. A refractory article suitable for casting molten metal, which is produced by a process comprising the steps of:

providing a mixture which comprises, based on the weight of said mixture, 30 to 64% of $Al_2O_3$, 20 to 40% of graphite, 10 to 20% of a synthetic resin, 1 to 8% of a refractory metallic powder, and 4 to 20% of a flux component comprising a first flux having a melting point of 550° to 900° C. and a second flux having a melting point of 1350° to 1550° C., the weight ratio of said first flux to said second flux being 2:1 to 1:15;

molding said mixture;

annealing the molded mixture to cure said synthetic resin;

heat-treating the annealed article at a temparature of up to 1000° C. which is sufficient to melt said first flux, in a non-oxidizing atmosphere; and subjecting the resultant article to a temperature of 900° to 1000° C. in an oxidizing atmosphere.

17. A refractory article according to claim 16, wherein the process further comprises applying a glaze to at least a portion of the total surface area of the article after said heat-treating step and before treatment in said oxidizing atmosphere.

* * * * *